(12) United States Patent
Ghosh

(10) Patent No.: US 11,369,088 B2
(45) Date of Patent: Jun. 28, 2022

(54) INDUSTRIAL LIVESTOCK MANAGEMENT LEVERAGING DIGITAL TWIN COMPUTING

(71) Applicant: International Business Machines Corporation, Armonk, NY (US)

(72) Inventor: Partho Ghosh, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/029,426

(22) Filed: Sep. 23, 2020

(65) Prior Publication Data

US 2022/0087228 A1    Mar. 24, 2022

(51) Int. Cl.

| A01K 29/00 | (2006.01) |
| G06Q 10/04 | (2012.01) |
| G16Y 40/10 | (2020.01) |
| G16Y 40/35 | (2020.01) |
| A01K 1/10  | (2006.01) |

(52) U.S. Cl.
CPC .......... *A01K 29/005* (2013.01); *G06Q 10/04* (2013.01); *G16Y 40/10* (2020.01); *G16Y 40/35* (2020.01); *A01K 1/10* (2013.01)

(58) Field of Classification Search
CPC ........ A01K 29/005; A01K 1/10; G06Q 10/04; G16Y 40/10; G16Y 40/35
USPC ...................................................... 340/573.3
See application file for complete search history.

(56) References Cited

U.S. PATENT DOCUMENTS

| 2014/0116341 A1* | 5/2014 | Kopic .................... A01K 29/00 119/14.02 |
| 2016/0125276 A1* | 5/2016 | Spicola, Sr. ........... G06V 10/10 382/110 |
| 2017/0202185 A1* | 7/2017 | Trumbull ........... A61B 5/14507 |
| 2018/0218057 A1* | 8/2018 | Beckham ............... G06Q 50/02 |
| 2019/0053470 A1* | 2/2019 | Singh ................... A01K 11/004 |
| 2020/0118313 A1* | 4/2020 | Phogat .................... G06F 17/16 |

FOREIGN PATENT DOCUMENTS

CN    110865671 A    3/2020

OTHER PUBLICATIONS

Jo et al., "Smart Livestock Farms Using Digital Twin: Feasibility Study", The 9th International Conference on Information and Communication Technology Convergence, ICTC 2018, 3 pages, <https://ieeexplore.ieee.org/abstract/document/8539516>.

(Continued)

*Primary Examiner* — Omar Casillashernandez
(74) *Attorney, Agent, or Firm* — Monchai Chuaychoo

(57) ABSTRACT

An approach for maintaining industrial livestock infrastructure is disclosed. The approach utilizes digital twin computing to create a digital copy of biological and non-biological assets of a livestock production unit/facility (e.g., aquaculture, sericulture, dairy industry, meat industry, etc.) to improve the efficiency and reduce cost associated with the production of livestock. The usage of digital twins removes fundamental constraints concerning place, time, and human observation. Instead of control based on direct observation of physical objects, which requires physical proximity, digital twins enable remote control of livestock operations coupled with IoT sensors. This allows for the decoupling of physical flows from information aspects of farm operations.

20 Claims, 4 Drawing Sheets

(56) References Cited

OTHER PUBLICATIONS

Mercyforanimals, "7 Shocking Things Factory Farms Have the Legal Right to Do", YouTube, posted on Jan. 2, 2018, 2 pages, <https://www.youtube.com/watch?v=Rbmw3rYKsJw>.

Mokal et al., "Use Cases: Digital Twin in Livestock Farming", Aranca, Mar. 6, 2020, 4 pages, <https://www.aranca.com/knowledge-library/articles/ip-research/use-cases-digital-twin-in-livestock-farming>.

* cited by examiner

INDUSTRIAL LIVESTOCK MANAGEMENT LEVERAGING DIGITAL TWIN COMPUTING

BACKGROUND

The present invention relates generally to livestock management, and more particularly to using digital twin technology for efficient management.

Automation in livestock farming and industries has enabled a huge leap in production efficiency, improvements and sustainability. Yet, the sector has to drastically increase productivity to feed the growing world population and to satisfy their changing food demands. To meet the food demands, livestock farming often lead to unethical and questionable methods of breeding and farming. Furthermore, an increase in pollution and waste can be attributed to industrial livestock farming.

SUMMARY

Aspects of the present invention disclose a computer-implemented method, a computer system and computer program product for maintaining industrial livestock infrastructure. The computer implemented method may be implemented by one or more computer processors and may include: receiving data associated with a livestock infrastructure; generating a digital twin copy of the livestock infrastructure based on the received data; generating livestock result data based on simulating one or more livestock scenarios associated with the digital twin copy; analyzing the livestock result data; creating an action plan based on analysis; and outputting the action plan.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
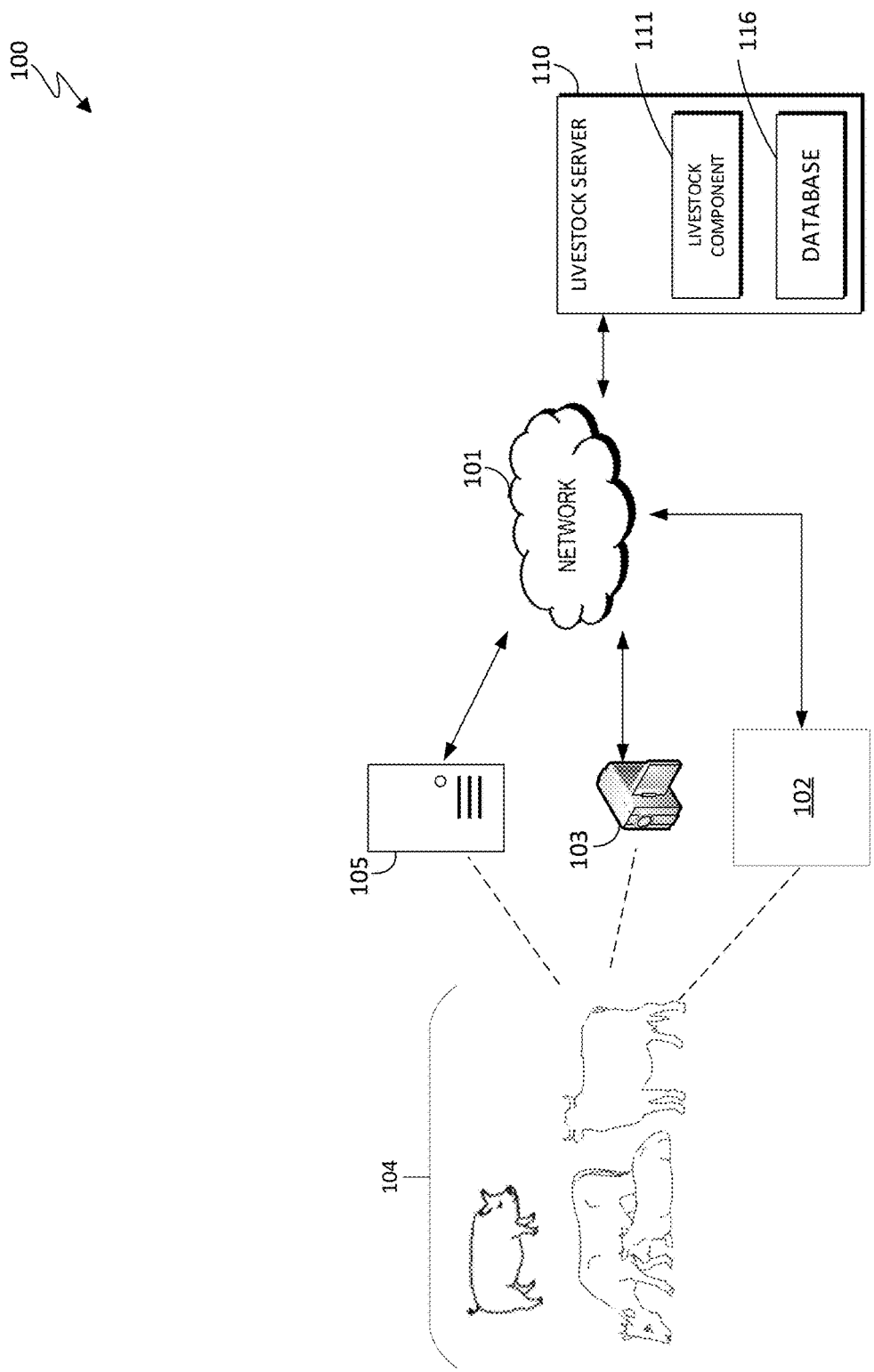
FIG. 1 is a functional block diagram illustrating a high level overview of the livestock management environment, designated as 100, in accordance with an embodiment of the present invention.

Digital twin leverages IoT, artificial intelligence (i.e., leveraging machine/deep learning) and software analytics to create living digital simulation models that update and change as their physical counterparts change. A digital twin continuously learns and updates itself from multiple sources, including IoT and sensors, to represent its near real-time status. A digital twin also integrates historical data from past machine usage to factor into its digital model. What is a simulation? A simulation is an approximation of a process and/or a system. The main difference between a simulation versus a digital twin model is that a simulation can help understand what may happen in the real world while a digital twin representation knows what is happening (i.e., real-time based on IoT and sensors).

Embodiments of the present invention provides an approach for livestock management. The approach utilizes digital twin computing to create a digital copy of biological and non-biological assets of a livestock production unit/facility(e.g., aquaculture, sericulture, dairy industry, meat industry, etc.) to improve the efficiency and reduce cost associated with the production of livestock. The usage of digital twins removes fundamental constraints concerning place, time, and human observation. Instead of control based on direct observation of physical objects, which requires physical proximity, digital twins enable remote control of livestock operations. This allows for the decoupling of physical flows from information aspects of farm operations. Furthermore, digital twins can not only represent actual states, but can also reproduce historical states and simulate future states.

Other embodiments of the present invention may recognize one or more of the following facts, potential problems, potential scenarios, and/or potential areas for improvement with respect to the current state of the art: i) create a cost effective ecosystem to capture and simulate animal conditions, animal shelter, animal hygiene, production quality, by-product re-usability thereby improving the management, efficiency, quality and sustainability of livestock farming in an ethical manner, ii) to scan and pick unhealthy animals for proper quarantine, medical care and observation thus preventing animal deaths and spread of diseases, iii) improving animal mental and traumatic health conditions, which can also be used to monitor nutritional value of food and water for different genres and purpose of livestock which eventually gives rise to more healthy livestock, iv) transforming the entire food production chain into smart webs of connected objects that are context-sensitive and can be identified, sensed and controlled remotely.

Other embodiments of the present invention can leverage digital twin technology and Neural Network can help the meat producers, farm managers and breeders to accurately know the healthy growing conditions for their livestock by sensing the parameters (e.g., pregnancy hormones, body and gut temperature, feed type, temperature, humidity, etc.) and identifying afflicted animals that can be isolated and treated in time and reducing the morbidity and mortality and preventing the spread of zoonotic diseases/outbreaks (e.g., H1N1, SARS, mad cow, etc.). For example, a digital twin network of multiple connected digital asset twins of an every involved module of a Livestock industry along with entire geospatial location would be able to simulate whether patterns, Diseased Livestock detection, Livestock health parameters, disease manifestation conditions, sanitization, thereby auto generate insights, warnings of a potential epidemic outbreak and/or alterations to policies related to health, government sanitizations.

Furthermore, digital twin exchange can also be used to scan and pick unhealthy animals for proper quarantine, medical care and observation thus preventing animal deaths and spread of diseases and also improvising animal mental and traumatic health conditions, they can also be used to monitor nutritional value of food and water for different genres and purpose of livestock. Livestock supervisors can be notified for timely supervision to take wise and ethical decisions, notify to prepare and plan periodic sanitization, food regulation, free ranging, threshold for milk production, animal drug abuse and etc. Additionally, digital twin simulation can be used to simulate past outbreaks there by predicting potential outbreak based on a threshold of various conditions but not limited to hygienic, environmental, nutritional regulation, drug regulatory condition. Thus, digital twin exchange would also enable auto tuning of livestock environmental conditions like temperature, humidity, light intensity, gaseous and odor conditions based on changes in weather, effects of livestock environmental changes in order to mitigate risk of outbreaks. For example, embodiment can schedule timely cleansing and/or maintenance activities based on the metrics derived from physical and nonphysical entities of each location and their corresponding exposure to natural & livestock induced environmental conditions like heat, rain water, carbon, sulfur emission, livestock waste, etc.

Other embodiments of the present invention can leverage digital twin technology, Neural Network can simulate the health conditions of each and every livestock individually by methods such as, Connect Animals and bio-tagging of chickens. Thus, each livestock can have digital tracking capability and monitoring of corresponding health parameters, which can include enabling smart features such as, digitally signaled birth and meat and breeding maturity. Digital data driven dairy production can rely on IoT sensors.

Other embodiments of the present invention can leverage digital twin technology, Neural Network and Blockchain can track authenticity of livestock produce into classifiers such as, but not limited to, free range eggs, organic eggs, mandarin honey, lavender honey, hybrid fish, inorganic and etc., using monitoring simulations of genomic analytics, food, environmental, drugging conditions and livestock health. For example, wool (e.g., lambswool, merino wool, Shetland wool, mohair, cashmere, angora can be tracked and validated for authenticity using blockchain technology to determine authenticity of wool from certain type of sheep and rabbits. Other wool type product such as camel hair, qiviut, alpaca and vicuna can also leverage blockchain technology via digital twin technology. Blockchain technology coupled with digital twin technology can be used for certain types of poultry eggs (e.g., standard white eggs, standard brown eggs, furnished/enriched/nest-laid eggs, free-run eggs, free-range eggs, organic eggs, omega-3 eggs, vitamin-enriched eggs, vegetarian eggs, processed eggs, etc.) to validate the authenticity and supply chain tracking.

Additionally, digital twin exchange of livestock simulation would also auto generate insights and potential red flags such as, but not limited to, animal cruelty, unethical processes by correlating the findings with geographic, animal welfare, location and country laws and would also be integrated to a blockchain enabled asset audit system enabled by livestock governing bodies. For example, regarding animal cruelty, block chain can be used to track various data points (e.g., food/water, hygiene, shelter, livestock handling, drugs-antibiotics, unhealthy breeding practices, excessive produce extraction, etc.) for audits by PETA or any animal welfare organization. These audits can be defined and used as per geographic/country and international Animal welfare policies, regulations and law.

Other embodiments of the present invention can leverage digital twin technology, Neural Network and perform futuristic prediction and choosing of parents to alter the DNA structure in order to have maximum yield implications and quality of offspring (i.e., pedigree) by enabling Genomic and DNA Intelligence. Embodiment can also enable sampling of Livestock individuals to determine predicting factors of individual Maturity, Individual yield capacity, Individual vulnerability to diseases. The genomic & DNA intelligence would also enable futuristic prediction and choice of parents to alter the DNA structure to have maximum yield implications and quality of offspring. Embodiment could be able to predict the nutritional and environmental parameters and thereby recommend optimum nutritional food, water and environmental conditions for a happy and healthy livestock.

Other embodiments of the present invention can leverage digital twin technology, Neural Network and dynamic herding techniques (based on machine learning and other sources) for learning, training and thereby replicating ideal herding conditions using AI enabled robots such as, but not limited to, robotic cheetah, and drones (i.e., imitating natural life and herding scenarios such as, but not limited to, sheep dog barking and sheep dog stalking).

Other embodiments of the present invention can leverage digital twin technology and Neural Network for collecting and obtaining the virtual model of an aquaculture farm (e.g., fish, oysters, shellfish, etc.) and establishing real and reliable of the aquiculture environment and equipment parameter anomalies to provide the intelligent decision making service to optimize the aquaculture production efficiency and reduce the aquaculture risk.

Other embodiments of the present invention can leverage digital twin technology and Neural Network for managing non-food products derived from livestock (i.e., non food consumption). For example, wool, collected from sheep, can be leveraged by digital twin technology, where management of the animal product can become more efficient and increase in quality. Other products from animals (e.g., rabbits, goats, sheep, cows, etc.) can include harvesting of fur/hide.

In another example, apiculture (i.e., honeybee farming) can take advantage of digital twin technology to increase yield, productivity and quality of the honey (e.g., taste, flavor, color and variety). Digital twin technology can replicate the honeybees but the surrounding environment (e.g., surrounding flower and other vegetation) that can affect their honey production.

In yet another example, silk production from silkworm can leverage digital twin technology to increase yield, quality and variety of silks. Digital twin technology can replicate the silkworm but the surrounding environment, including diet (e.g., mulberry leaves, silkworm chow, etc.), that can affect their silk production.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating a livestock management environment 100 in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Livestock management environment 100 includes network 101, farming device 102, sensors 103, livestock infrastructure 104, digital twin server 105 and livestock server 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between livestock server 110, sensors 103, farming device 102 and other computing devices (not shown) within livestock management environment 100. It is noted that other computing devices can include, but is not limited to, farming device 102 and any electromechanical devices capable of carrying out a series of computing instructions.

Farming device 102 can be an electro-mechanic device capable of executing instructions from livestock server 110. Farming device 102 can include autonomous robotic drone for herding, feeding livestock, applying medicine/injections and perform myriads of livestock management functionality.

Sensors 103 can be any smart device (e.g., IoT, IP camera, etc.) used for detecting objects, chemical compounds/elements, auditory signals, electromagnetic signal and images. Sensors 103 can include IoT devices, such as, cameras, olfactory, thermal sensors/imaging, microphones, and chemical detectors. Furthermore, sensors 103 can include livestock management sensors, such as, temperature sensor of animal/surrounding/water supply, sensor for detecting composition of animal waste as a feedback loop to help with regulation of diet and hygiene. Sensors 103 can be located/attached to livestock. For example, blood droplet analyzer that can identify composition of the blood to determine maturity, nutrient, etc. of the livestock.

Livestock infrastructure 104 can be any livestock structure (e.g., chicken coop, cow pasture, pig pen, shrimp farm, oyster farm, fish farm, etc.) including being analyzed and/or copied for digital twin representation by the embodiment. Livestock infrastructure 104 can include the livestock themselves and any supporting equipment (e.g., water trough, food delivery mechanism, etc.) associated with livestock farming. Livestock can include, but it is not limited to, poultry, pigs, cattle, sheep, horse, fish, seafood, bees, and rabbits. Poultry can include chickens, turkeys, duck, geese, guinea fowls and squabs.

Digital twin server 105 can be servers used to simulate the digital twin of livestock infrastructure 104. Digital twin server can communicate with sensors 103 to update the simulation status. Furthermore, digital twin server 105 can communicate with other computing devices (not shown) in order to leverage artificial intelligence capabilities of the integrated workplace management system (IWMS) and Asset Performance Management (APM) platforms. IWMS is a software platform (i.e., IBM TRIRIGA®) that helps organizations optimize the use of workplace resources, including the management of a company's building portfolio, infrastructure and facilities assets. IWMS solutions are commonly packaged as a fully integrated suite or as individual modules that can be scaled over time. They are used by corporate occupiers, building services firms, facilities services providers, landlords and managing agents. Thus, IWMS can be easily adaptable to a high-volume farming conglomerate/business. APM system are used to improve the reliability and availability of physical assets while minimizing risk and operating costs. APM platforms, such as, IBM Maximo®, typically includes condition monitoring, predictive maintenance, asset integrity management, reliability-centered maintenance, and often involves technologies such as asset health data collection, visualization, and analytics. APM can be used in conjunction with EAM (enterprise assessment management) system for a complete and holistic management of business objective. Similarly, APM system can also be easily adaptable to a high-volume farming conglomerate/business.

Livestock server 110 and digital twin server 105 can be a standalone computing device, a management server, a web server, a mobile computing device, or any other electronic device or computing system capable of receiving, sending, and processing data. In other embodiments, livestock server 110 and digital twin server 105 can represent a server computing system utilizing multiple computers as a server system, such as in a cloud computing environment. In another embodiment, livestock server 110 and digital twin server 105 can be a laptop computer, a tablet computer, a netbook computer, a personal computer (PC), a desktop computer, a personal digital assistant (PDA), a smart phone, or any other programmable electronic device capable of communicating other computing devices (not shown) within livestock management environment 100 via network 101. In another embodiment, livestock server 110 and digital twin server 105 represents a computing system utilizing clustered computers and components (e.g., database server computers, application server computers, etc.) that act as a single pool of seamless resources when accessed within livestock management environment 100.

Embodiment of the present invention can reside on livestock server 110. Livestock server 110 includes livestock component 111 and database 116.

Livestock component 111 provides the capability of gathering historical and/or real-time data from sensors 103 (and other sources) associated with the livestock infrastructure 104 combined with a corpus knowledge of livestock management and running a simulation using twin digital computing. Livestock component 111, based on the result of the simulation, can make create an action plan based on the result (e.g., recommend adjust food source composition in order to create a higher yield product, recommend spraying and maintaining a clean the areas of livestock to mitigate the risk of pathogens and diseases, etc.).

Database 116 is a repository for data used by livestock component 111. Database 116 can be implemented with any type of storage device capable of storing data and configuration files that can be accessed and utilized by livestock server 110, such as a database server, a hard disk drive, or a flash memory. Database 116 uses one or more of a plurality of techniques known in the art to store a plurality of information. In the depicted embodiment, database 116 resides on livestock server 110. In another embodiment, database 116 may reside elsewhere within livestock management environment 100, provided that livestock component 111 has access to database 116. Database 116 may store information associated with, but is not limited to, knowledge corpus, i) surrounding environment including vegetation, terrain, water supply, water composition, etc., ii) livestock information (e.g., best food for gain, offspring expectation, DNA/genome information, breeding patterns, etc.), iii) location tracker of chip implanted in livestock, iv) weather pattern associated with the facility and v) historical disease (i.e., outbreak) control plan and actions.

Figure 2:
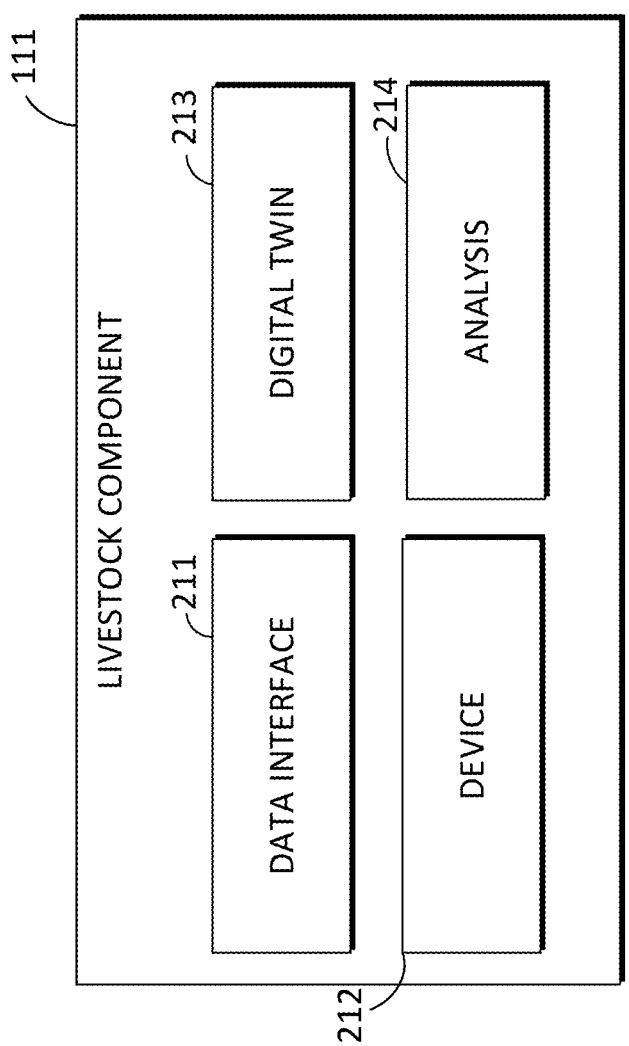
FIG. 2 is a functional block diagram illustrating the subcomponents of livestock component 111, in accordance with an embodiment of the present invention.

FIG. 2 is a functional block diagram illustrating livestock component 111 in accordance with an embodiment of the present invention. In the depicted embodiment, livestock component 111 includes data interface component 211, device component 212, digital twin component 213 and analysis component 214.

As is further described herein below, data interface component 211 of the present invention provides the capability of communicating with data servers (i.e., IWMS, APM servers, etc.) to obtain relevant information associated with a particular livestock infrastructure/premise including the livestock. The relevant information can include, but it is not limited to, building size, specifications related to all materials used throughout the building, date of installation and date of previous pest inspection. It is noted that data provided by the IWMS and/or APM system could be used to feed into digital twin component 213 and/or directly to digital twin server 105. It is noted that data interface component 211 can communicate (i.e., send and retrieve) data from database 116.

As is further described herein below, device component 212 of the present invention provides the capability of communicating with sensors (i.e., sensors 103) to obtain real-time and/or historical information associated with various sensors (e.g., IoT devices, moisture, temperature, soil sensors, thermal camera, microphones, etc.) attached to the livestock infrastructure/premise.

The information from device component 212 can further be communicated to digital twin server 105 and/or digital twin component 213.

Furthermore, device component 212 has the capability of communicating and control farming device 102. For example, device component 212 can guide the robotic drone (i.e., equipped with sanitizing spray) to the targeted location to decontaminate potential bacteria/viral outbreak in the livestock area. In another example, device component 212 can activate a smart UV laser/light to de-contaminate living and eating quarter of livestock. In yet another example, device component 212 can gather (i.e., herd) livestock using autonomous drones (i.e. dog-like robot).

As is further described herein below, digital twin component 213 of the present invention provides the capability of communicating with digital twin server 105. Digital twin component 314, can run simulations, with AI, of various scenarios on digital twin server 105. Scenarios can include: i) determining health condition of livestock by monitor livestock health parameters (e.g., pregnancy hormones, body and gut temperature, feed type, temperature, humidity, etc.), ii) predict potential disease outbreak based on disease parameters (e.g., hygienic, environmental, nutritional regulation, drug regulatory condition, temperature, humidity, light intensity, gaseous and odor conditions, etc.), iii) monitor sanitary conditions based on sanitary parameters (e.g., heat, rain water, carbon, sulfur emission, livestock waste, etc.) which may include disease parameters, iv) determining optimal nutritional value of livestock based on nutritional parameters (e.g., optimum nutritional food, water and environmental conditions, etc.), v) determining optimal selection of future offspring based on parental lineage of livestock based on pedigree parameters (e.g., individual maturity, individual yield capacity, individual vulnerability to diseases, etc.), vi) determining optimal herding techniques for group of livestock, vii) determining optimal condition for aquaculture farming.

Furthermore, digital twin component 213 can, through device component 212, receive data from various IoT devices and other sensors to provide real-time data to update the digital twin copy.

As is further described herein below, analysis component 214 of the present invention provides the capability of analyzing data from digital twin component 213 based on the simulation runs. Analysis component 214 can perform the following, but is not limited to, function, including making recommendations, creating action plan (e.g., maintenance plan, etc.) and executing action plan based on the analysis.

An action plan can include recommendation for the food type necessary for rapid growth and optimal nutritional value of a livestock during the growth phase. In another example, the action plan can include recommendation for selecting the parental until for breeding that will yield the optimal offspring based on i) DNA of the parent, ii) climate condition, iii) growth rate and other factors.

A maintenance plan, by analysis component 214, can include, but it is not limited to, recommendation for maintenance (of a building infrastructure that houses/contain livestock) as it relates to i) material replacement and repair of pens, feeding apparatus, waste management system, ii) anti-contaminators based on potential insect breeding conditions and devices to control insect manifestations (e.g., non-lethal rat trap, mosquito repellent, insect repellent plants, etc.) and iii) periodic spraying of sanitizing to control and mitigate harmful bacteria and/or viral growth.

In other embodiment, analysis component 214 can send data from digital twin component 314 to a remote system (e.g., IWMS, APM, etc.) for further analysis and action. The analysis performed from remote system (i.e., belonging to service centers/vendor) will be done in a periodic basis to identify any potential problem and the possible root cause analysis and future problems/issues.

Figure 3:
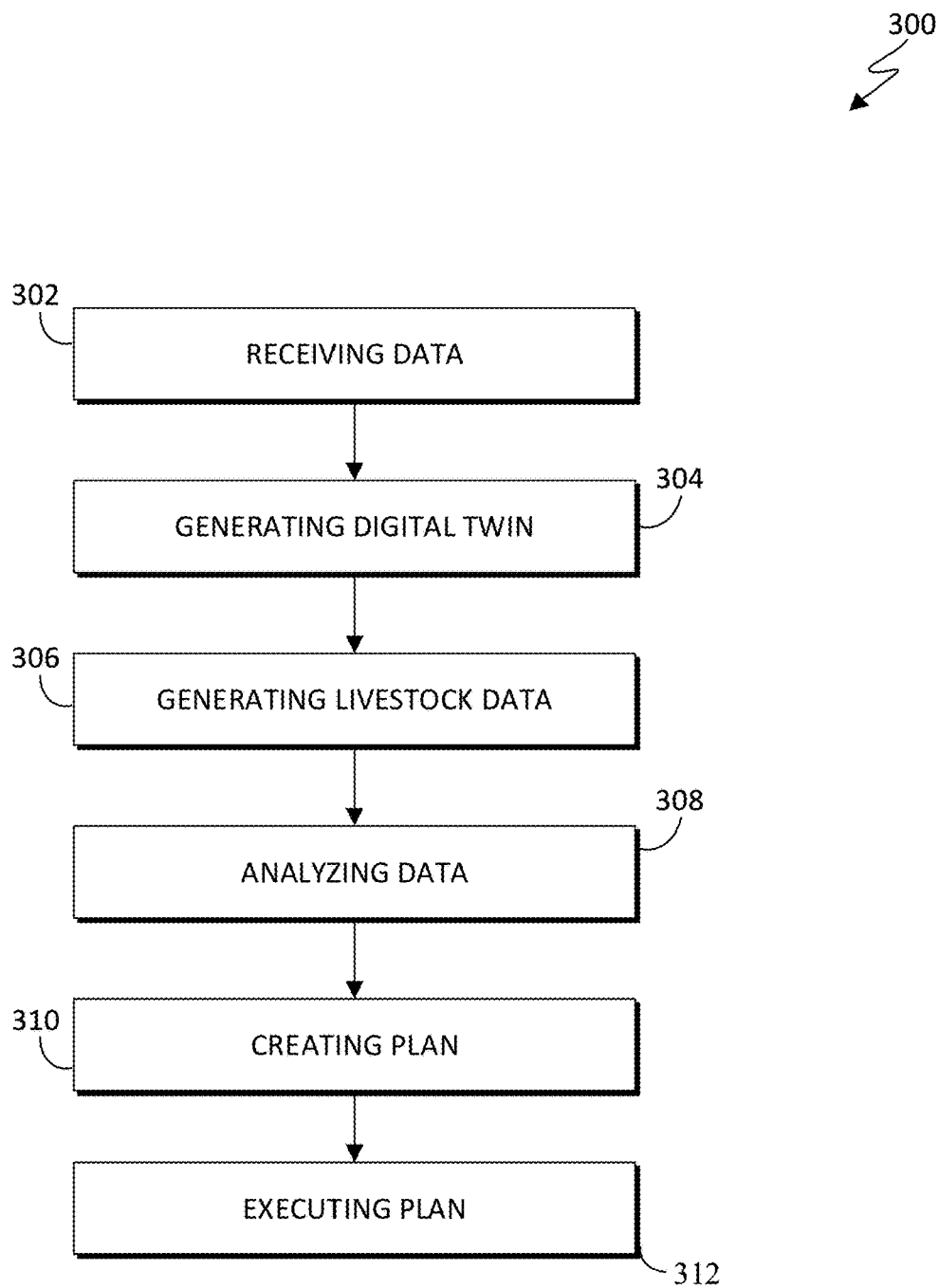
FIG. 3 is a high-level flowchart illustrating the operation of livestock component 111, designated as 300, in accordance with an embodiment of the present invention.

FIG. 3 is a flowchart illustrating the operation of livestock component 111, designated as 300, in accordance with another embodiment of the present invention.

Livestock component 111 receives data (step 302). In an embodiment, livestock component 111, receives from data interface component 211 associated with the target infrastructure. For example, a beef farm that specializes in high-end Wagyu beef would like to leverage digital twin technology to increase productivity and quality of their beef. The farm has 30 acres of grazing land, one large building that houses 300 cows and all associated infrastructure (e.g., food, water, etc.) that supports a typical beef farm operation. All the digital information related to the beef farm operation is sent to and received livestock component 111.

Livestock component 111 generates digital twin (step 304). In an embodiment, livestock component 111, through digital twin component 213, creates digital twin copy of the target infrastructure (i.e., livestock infrastructure 104). For example, using the prior example, data from sensors 103 and/or from IWMS/APM system is used by digital twin server 105 to create an exact digital replica of the beef farm operation. Thus, the entire infrastructure including cattle, grazing land composition, weather pattern has been digitalized and replicated in the virtual environment.

Livestock component 111 generates livestock result data (step 306). In an embodiment, livestock component 111, through digital twin component 213, initiate several simulations and scenarios related to ideal food composition, ideal exercise regimen, risk mitigation strategy with pests/disease outbreak, improving quality of the beef and any other scenarios to maximize yield related to the beef operation on the digital twin copy of the beef farm. A livestock result data is generated based on the scenario/simulation. The livestock result data can include, but it is not limited to, i) health summary of all 300 cattle, ii) historical tracking of location of each cattle throughout the grazing pasture and iii) weather forecast for the next 10 days result.

Livestock component 111 analyzes livestock result data (step 308). In an embodiment, livestock component 111, through analysis component 214, analyzes the livestock result data generated by the scenarios/simulations. For example, using the prior example, a livestock result data indicates i) some of the cattle is experiencing unhealthy behavior, ii) ideal breeding condition of flies (e.g., horse fly, cattle fly, etc.) is developing from the southwest corner of the farm near the pond based on the change in weather pattern and pond content and iii) some of cattle is closed to maturity for breeding.

Livestock component 111 creates an action plan (step 310). In an embodiment, livestock component 111, through analysis component 214, create an action plan based on the pest liability data. For example, using the prior example, analysis component 214 recommends the following action plan regarding unhealthy cattle: switch to a multi-grain food type coupled with vitamins necessary to make the cattle feel better, retrieve blood and/or waste sample to test for any bacterial/viral infections, continuously monitoring of the unhealthy cattle via IoT sensors. Another action plan (generated by livestock component 111) is related to the ideal breeding condition of certain flies that are pests/enemy to the cattle: spray certain anti-fly chemical (but ground water safe) in the surrounding area grassy area next to the pond, introduce a certain type of fish that are natural predator to the larvae of the fly and/or the fly itself and fence off the pond area from grazing. Another action plan is related to the fact that some of cattle is closed to maturity for breeding. Thus, the action plan can include recommendation for selecting the parental until for breeding that will yield the optimal offspring based on i) DNA of the parent, ii) climate condition, iii) growth rate and other factors.

It is noted that the action plan can be created by livestock component 111 and/or created by IWMS and/or APM system.

Livestock component 111 output the action plan (step 312). In an embodiment, livestock component 111, through analysis component 214 and/or device component 212 may execute the action plan by sending instructions to a facility management company and/or to a IWMS/APM system. For example, analysis component 214 can execute the action plan related to the unhealthy behavior of some cattle by, i) sending drones (i.e., farming device 102) to give a booster injection to those cattle, ii) quarantine, via herding by drones/manually by the user, those cattle in a different part of the pasture and/or building and iii) change the feed type with additional vitamins and nutrients to help the cattle feel better.

Figure 4:
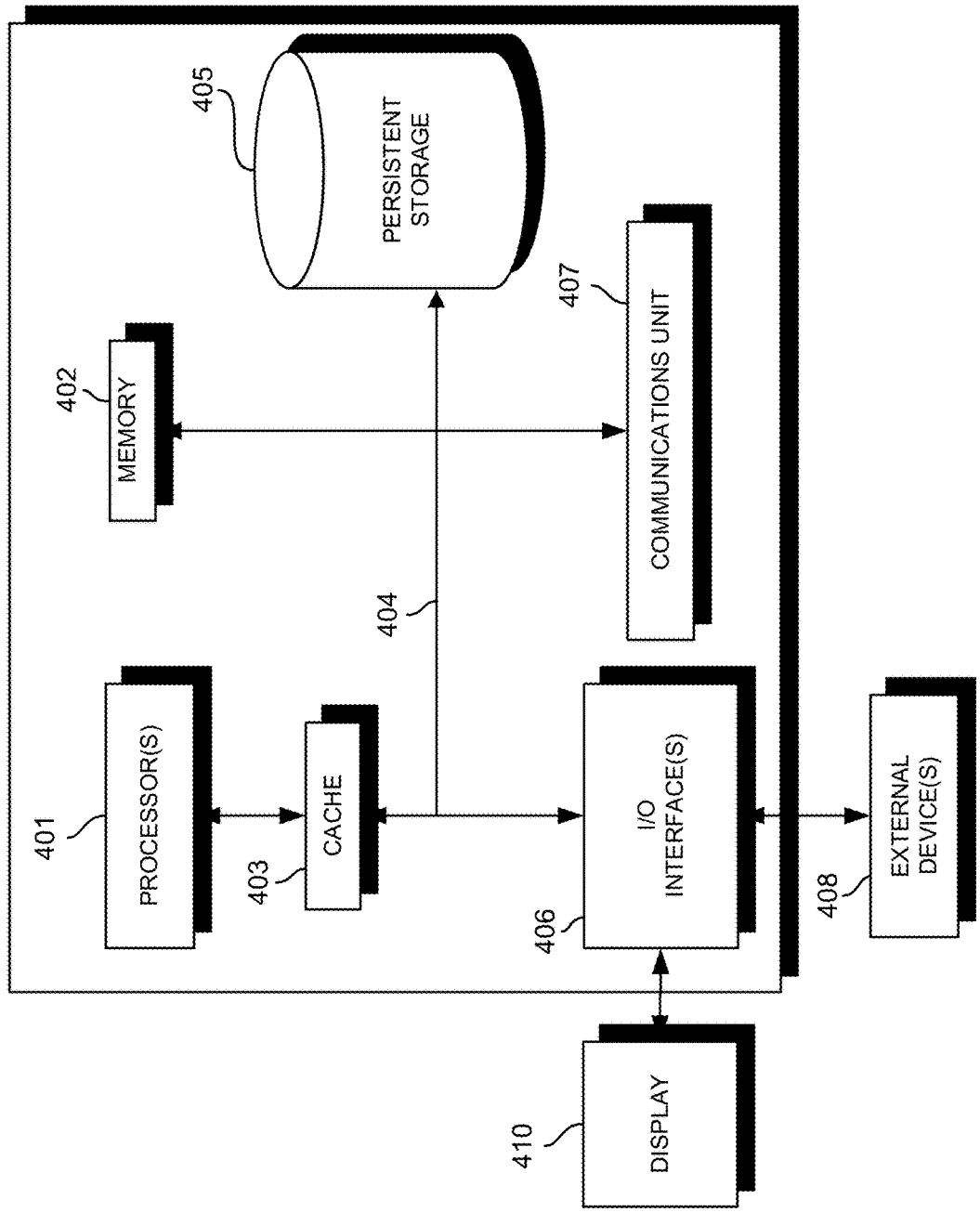
FIG. 4 depicts a block diagram, designated as 400, of components of a server computer capable of executing the livestock component 111 within the livestock management environment 100, in accordance with an embodiment of the present invention.

FIG. 4, designated as 400, depicts a block diagram of components of livestock component 111 application, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

FIG. 4 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data (e.g., software and data x10) used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Livestock component 111 can be stored in persistent storage 405 for access and/or execution by one or more of the respective processor(s) 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data (e.g., Livestock component 111) used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Program instructions and data (e.g., Livestock component 111) used to practice embodiments of the present invention can be stored on such portable computer readable storage media and can be loaded onto persistent storage 405 via I/O interface(s) 406. I/O interface(s) 406 also connect to display 410.

Display 410 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for maintaining aquaculture infrastructure, the computer-implemented method comprising:
   receiving historical data associated with a aquaculture infrastructure;
   generating a digital twin copy of the aquaculture infrastructure based on the received-historical data;
   simulating, by using AI (artificial intelligence) technology, one or more aquaculture scenarios associated with the digital twin copy;
   generating aquaculture result data based on simulating the one or more aquaculture scenarios;
   analyzing the aquaculture result data;
   generating authenticity tracking for harvesting from the aquaculture infrastructure based on blockchain technology;
   creating an action plan based on analysis; and
   outputting the action plan.

2. The computer-implemented method of claim 1, wherein the received historical data further comprises of the aquaculture infrastructure data, aquaculture farming device and IoT sensors.

3. The computer-implemented method of claim 1, simulating the one or more aquaculture scenarios further comprises:
   creating the one or more livestock scenarios based on the digital twin copy of the aquaculture infrastructure, the received historical data and real-time IOT data.

4. The computer-implemented method of claim 1, wherein the one or more aquaculture scenarios further comprises of, reducing aquaculture risk, and determining optimal condition for aquaculture farming.

5. The computer-implemented method of claim 1, wherein the aquaculture result data further comprises of real-time status of the aquaculture infrastructure.

6. The computer-implemented method of claim 1, wherein the action plan further comprises of recommend adjust food source composition and recommend spraying and maintaining a clean the areas of aquaculture.

7. The computer-implemented method of claim 1, wherein outputting the action plan further comprises: sending a farming device to clean the aquaculture infrastructure.

8. A computer-implemented method for managing products derived from livestock, the computer-implemented method comprising:
   receiving data associated with a livestock infrastructure;
   generating a digital twin copy of the livestock infrastructure based on the received data;
   simulating, by using AI (artificial intelligence) technology, one or more livestock scenarios on the digital twin copy, wherein the one or more livestock scenarios are associated with the products derived from the livestock;
   generating livestock products result data based on simulating the one or more livestock scenarios;
   analyzing the livestock products result data;
   generating authenticity tracking for the products derived from the livestock by using blockchain technology;
   creating an action plan based on analysis of the livestock products result data; and
   outputting the action plan.

9. The computer-implemented method of claim 8, wherein the received data further comprises of the livestock infrastructure data, farming device and IoT sensors.

10. The computer-implemented method of claim 8, wherein the product derived from the livestock comprises of, wool, fur/hide, eggs, honey and silk.

11. A computer-implemented method of claim 8, wherein the one or more livestock scenarios further comprises of, determining how to increase yield, quality and variety of silks, determining how to increase yield, productivity and quality of honey, determining how to increase efficiency and quality for wool and fur/hide.

12. The computer-implemented method of claim 8, wherein the authenticity tracking for the products derived from the livestock includes determining the authenticity of lambs wool, merino wool, Shetland wool, mohair, cashmere and angora.

13. The computer-implemented method of claim 8, wherein the action plan further comprises of recommendation of adjusting food source composition, such as flower and vegetation for bees to vary honey production and mulberry leaves, silkworm chow for silkworm to vary the silk production.

14. The computer-implemented method of claim 8, wherein the authenticity tracking for the products derived from the livestock includes determining the authenticity of camel hair, qiviut, alpaca and vicuna; and
   activate a smart UV laser/light to de-contaminate living and eating quarter of livestock.

15. A computer system for maintaining aquaculture infrastructure, the computer system comprising:
   one or more computer processors;
   one or more computer readable storage media;
   program instructions stored on the one or more computer readable storage media for execution by at least one of the one or more computer processors, the program instructions comprising:
   program instructions to receive historical data associated with a aquaculture infrastructure;
   program instructions to generate a digital twin copy of the aquaculture infrastructure based on the received historical data;
   program instructions to simulate, by using AI (artificial intelligence) technology, one or more aquaculture scenarios associated with the digital twin copy;

program instructions to generate aquaculture result data based on simulating the one or more aquaculture scenarios;

program instructions to analyze the aquaculture result data;

program instructions to generate authenticity tracking for harvesting from the aquaculture infrastructure based on blockchain technology;

program instructions to create an action plan based on analysis; and program instructions to output the action plan.

16. The computer system of claim 15, wherein received historical data further comprises of the aquaculture infrastructure data, aquaculture farming device and IoT sensors.

17. The computer system of claim 15, wherein the one or more aquaculture scenarios further comprises of, reducing aquaculture risk, and determining optimal condition for aquaculture farming.

18. The computer system of claim 15, wherein the aquaculture result data further comprises of real-time status of the aquaculture infrastructure.

19. The computer system of claim 15, wherein the action plan further comprises of recommend adjust food source composition and recommend spraying and maintaining a clean the areas of aquaculture.

20. The computer system of claim 15, wherein outputting the action plan further comprises:

program instructions to send a farming device to clean the aquaculture infrastructure.

* * * * *